Dec. 8, 1970     E. S. SWENSON ET AL     3,545,221
APPARATUS FOR MAINTAINING ORGANS IN VITRO IN
A COMPLETELY VIABLE STATE

Filed May 22, 1967     2 Sheets-Sheet 1

INVENTORS
EMIL S. SWENSON,
WILLIAM L. KOSKI
BY
Williamson, Palmatier
& Bains
ATTORNEYS

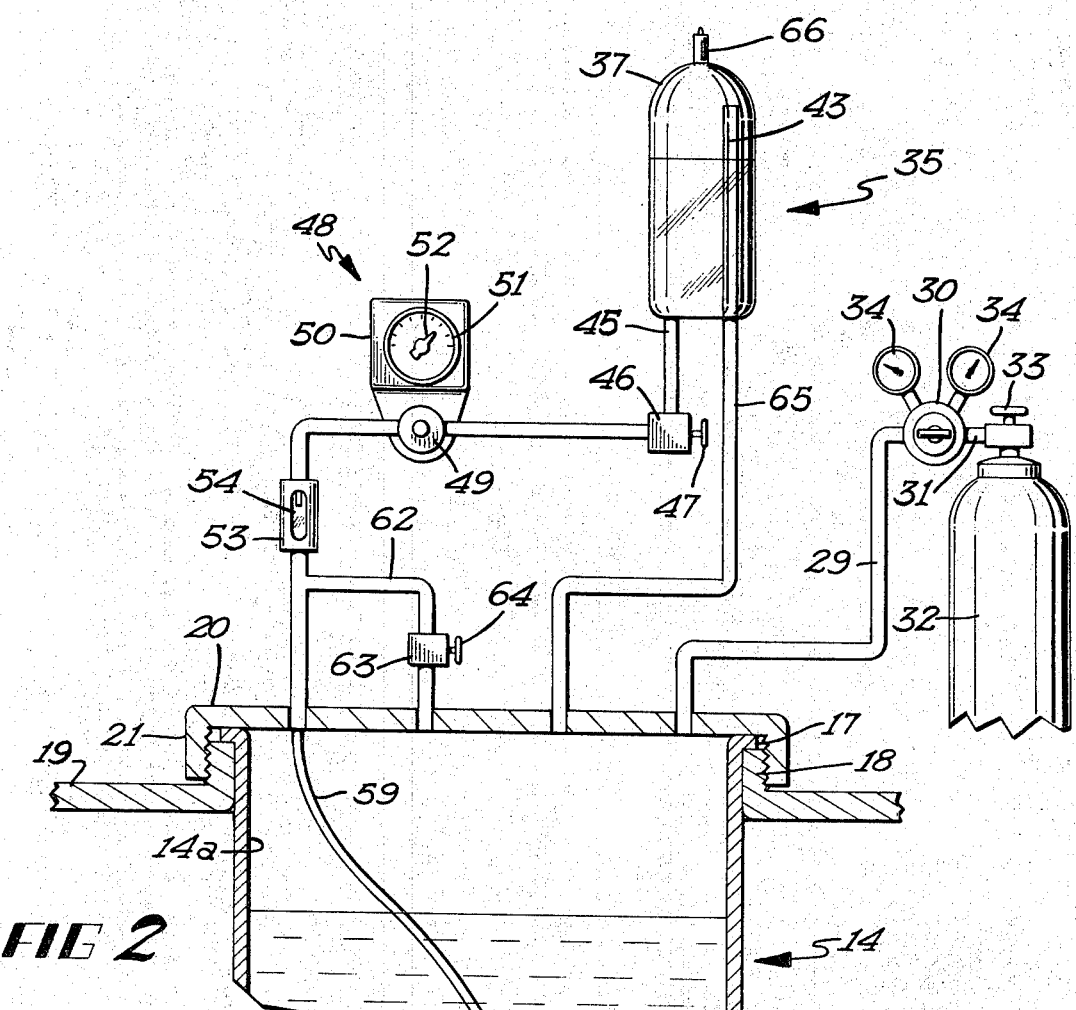
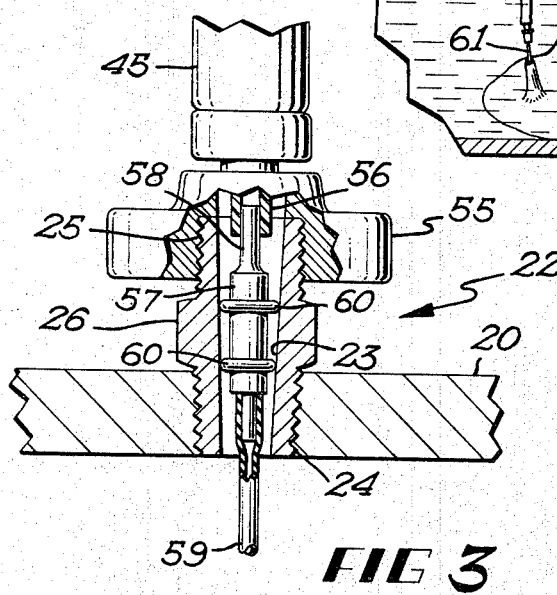

3,545,221
APPARATUS FOR MAINTAINING ORGANS IN VITRO IN A COMPLETELY VIABLE STATE
Emil S. Swenson, Coon Rapids, and William L. Koski, Minnneapolis, Minn., assignors to Swenko Research & Development, Incorporated, Minnneapolis, Minn., a corporation of Minnesota
Filed May 22, 1967, Ser. No. 640,265
Int. Cl. C12k 9/00
U.S. Cl. 62—231                    4 Claims

ABSTRACT OF THE DISCLOSURE

Whole organ preservation apparatus including a refrigerated preservation chamber having a preserving solution therein, which is maintained at a temperature of approximately 0–4° C. and in which the organ to be transplanted is immersed. The preservation chamber being connected to a source of oxygen under pressure so that the interior of the chamber which is sealed from the exterior is subjected to oxygen pressure of approximately 3 atmospheres, and the perfusion container adapted to contain a liquid perfusate and being connected by a pressure conduit with the preservation chamber to equalize the pressure therebetween. A perfusion conduit connected to the perfusion chamber and extending into the preservation chamber and having a cannula at its end for insertion into the blood vessel of an organ to be preserved, whereby the organ may be perfused with a cold perfusate by action of gravity. And control means interposed in flow controlling relation in said perfusion conduit to permit automatic controlled intermittent fusion of the organ.

---

This invention relates to an apparatus for use in maintaining whole organs in vitro in a normal viable state for transplantation.

An object of this invention is to provide an apparatus for preserving whole organs in vitro in a normal viable state prior to transplanting the organ, including a preservation chamber in which the organ is placed, the preservation chamber being subjected to hypothermia and hyperbaric conditions, with provision of a perfusion container having suitable controls for controlling gravity flow of the perfusate through the perfusion line into a blood vessel of the organ being preserved.

A more specific object of this invention is the provision of a whole organ preservation apparatus of the class described, in which the control means for controlling the flow of perfusate through the perfusion line by action of gravity, comprises a percentage timer mechanism which is solenoid activated and which thereby allows controlled, automatic intermittent perfusion.

These and other objects and advantages of this invention will more fully appear from the following description made in connection with the accompanying drawings wherein like reference characters refer to the same or similar parts throughout the several views, and in which:

FIG. 2 is a diagrammatic flow diagram of certain parts of the apparatus; and

FIG. 3 is a fragmentary elevational view with certain parts thereof broken away illustrating certain details of construction of a part of the apparatus.

Figure 1:
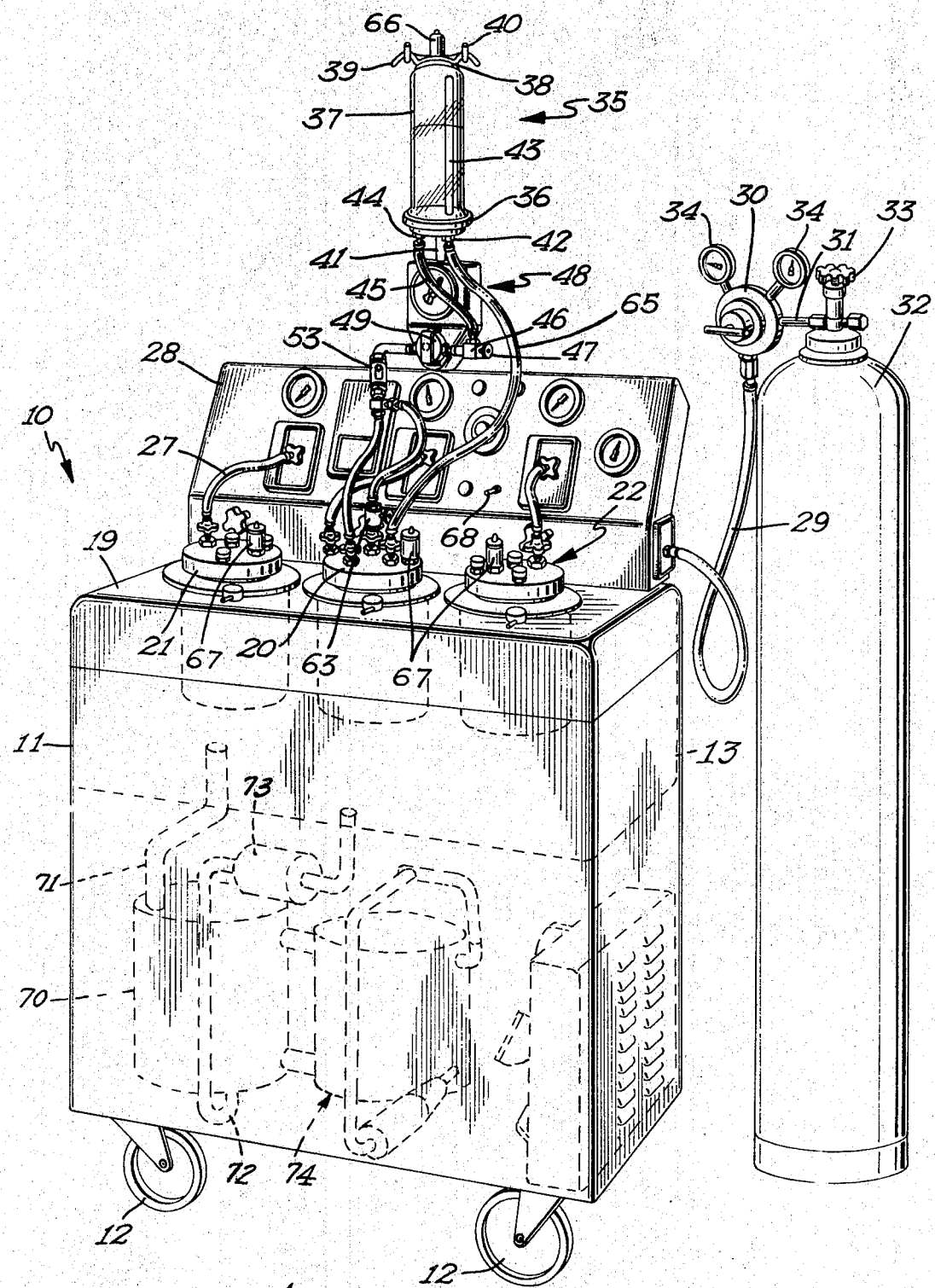
FIG. 1 is a perspective view of the apparatus comprising the present invention.

Referring now to the drawings, and more specifically to FIG. 1, it will be seen that one embodiment of the whole organ preservation apparatus, designated generally by the reference numeral 10 is there shown. Apparatus 10 includes a housing 11 having casters 12 and which is provided with a hypothermia tank 13 in the upper portion thereof. This hypothermia tank is substantially identical to the one illustrated in my co-pending application Ser. No. 391,931, filed Aug. 25, 1964 and contains a predetermined amount of liquid coolant therein. The coolant is used to cool preservation receptacles and for this purpose any suitable liquid coolant may be used, such as a permanent antifreeze solution, a weak alcohol solution or the like, in the manner of my co-pending application. The liquid coolant is maintained at a temperature within the range of 0° C.–4° C. by suitable refrigeration mechanism, also identical to that shown in my co-pending application. It is felt for the purpose of the instant application, a detail explanation of the hypothermia tank and refrigeration system for cooling the coolant thereof is unnecessary for the instant application, since it is substantially identical to that disclosed in my co-pending application.

However, a coolant tank 70 is provided and is connected to the tank 13 by a conduit 71. A conduit 72 also interconnects the coolant tank with a hypothermia tank 13, and a pump 73 is interposed in flow controlling relation in the conduit 72. Thus the liquid coolant circulates between the hypothermia tank 13 and the tank 70.

The coolant tank 70 has refrigerant coils wound concentrically exteriorly thereof so that the coolant in the tank 70 will be continuously cooled. The refrigerant coils are connected to the refrigeration system 74 which includes a conventional hermetic motor-compressor assembly, a condenser, receiver, condenser fan and motor, all of which are mounted in the housing 11.

A plurality of preservation receptacles 14 are provided, each being constructed of a suitable rigid material and each including a bottom wall 15 having a continuous upstanding peripheral wall 16 integrally formed therewith. The closed continuous peripheral wall 14 has an outturned lip 17 at its upper end, which is positioned upon the upper edge of an externally threaded flange or embossment 18 of the upper wall 19 of the housing 11. Thus, it will be seen that the preservation receptacles 14, which are all identical in construction, are suspended from the upper wall of the housing 11, and extend downwardly into the hypothermia chamber, so that the interior of the receptacle will be cooled. The upper end of the preservation receptacle 14 is opened to define an access opening, which is closed by a substantially flat closure member or cover 20, which is provided with a downturned internally threaded annular flange 21, which is threadingly engageable with the embossment or flange 18. When the closure member is applied to the preservation receptacle, the receptacle is sealed from the exterior.

Each closure member 20 is provided with four substantially identical fittings 22, one of which is illustrated in detail in FIG. 3. It will be seen, that each fitting 22 has a bore 23 therethrough and has a threaded lower end 24, which threadingly engages a threaded opening in the closure member 20. Each fitting also has a threaded upper end 25 and also includes a hand grip portion 26. The upper threaded end of one fitting on each cover is threadingly connected in communicating relation to one end of a conduit 27, which has its other end connected in communicating relation to one of a plurality of fittings which are secured to an instrument panel 28. A manifold line, not shown, is connected to a pneumatic supply conduit 29, which has its other end connected to a valve 30, which in turn is connected to an outlet pipe 31 of an oxygen tank 32. The manifold line is connected in communicating relation with the conduits 29 by the fittings on the instrument panel 28. The oxygen tank is provided with a conventional suitable control valve 33, while the valve 30 is provided with a pair of conventional pressure gauges 34. Thus, it will be seen that oxygen under pressure may be selectively supplied to the various preservation receptacles.

The oxygen pressure in the preservation receptacles is approximately three atmospheres of oxygen and the pressures thus used have been approximately 60 to 100 p.s.i. In practice, it has been found that the oxygen pressure within the preservation receptacles need not ordinarily exceed 75 p.s.i. in order to provide the desirable hyperbaric conditions for organ preservation. The apparatus 10 also includes a perfusion container 35 including a bottom wall structure 36, preferably formed of a suitable metal and having an upstanding transparent continuous peripheral wall 37 secured thereto. This peripheral wall 37 may be formed of a suitable plastic material and is secured to an upper wall structure 38, which is formed of a suitable metal. This upper wall structure is provided with a pair of suspension hooks 39, which engage cooperating hooks 40, that are secured to an upstanding post 41, which in turn is rigidly affixed to the instrument panel 38. It will be noted, that when the perfusion container 35 is suspended from the support post 41, the container will be positioned substantially above the preservation receptacles. Although only one such perfusion container is shown, it is pointed out that in the event that all three preservation receptacles are simultaneously used, each will have a perfusion container associated therewith. The lower wall structure 36 of the perfusion container has a fitting 42 secured thereto and intercommunicating with the interior thereof. A stand pipe 43 is connected to the fitting and projects upwardly from the bottom wall structure and interiorly of the container. It will be noted, that the upper end of the stand pipe 43 terminates adjacent the upper wall structure 38. The bottom wall structure 36 also has a second fitting 44 secured thereto which communicates with the interior of the container and this fitting 44 is connected to a flexible perfusion conduit 45.

The perfusion conduit or line 45 is connected at its lower end to one of the fittings 22 and is actually constituted of a plurality of sections interconnected together in communicating relation. To this end, it will be noted that interposed in flow controlling relation in the perfusion line 45 is a manually operable valve 46, which has an actuating handle for controlling the valve element thereof. The valve handle 47 may be adjusted to shift the valve element thereof between opened and closed position to thereby control the flow of liquid through the perfusion conduit 45. A timer or percentage type valve control mechanism 48 is also interposed in flow controlling relation with respect to the perfusion conduit or line 45 and is located on the downstream side of the manual valve 46. This percentage valve control mechanism 48 includes a solenoid valve 49, which is operable to open the perfusion conduit 45 when energized and when de-energized closes the perfusion conduit. A percentage timer 50, which is capable of being preset also constitutes part of the percentage valve control mechanism 48 and is interposed in circuit controlling relation with respect to the circuit to the solenoid valve 49. The timer control has an indicator valve 51, which is provided with calibrated indicia and a preset-type adjustable pointer 52. In the embodiment shown, the timer control device 50 is of a commercial type which affords an operator a wide range of settings. For example, the pointer 52 may be preset on 20 so that a solenoid valve will be opened 20% of the time and will be closed the remaining 80% of the time the apparatus is in operation. It is preferable that the timer be calibrated in terms of seconds, so that when a setting of 20 is used, the solenoid valve 49 will be open for 12 seconds and alternately closed for 48 seconds in continuous cycles.

A small coupling 53 is also interposed in the perfusion conduit 45 and is provided with a small sighting window 54 therein to permit an observer to observe the amount of flow of the perfusate from the perfusion container. To this end, it will be noted that a section of the perfusion conduit 45 is reduced and is observable through the window 54 so that the perfusate flow, which is in drop fashion may be readily noted.

Referring again to FIG. 3, it will be seen that the perfusion conduit 45 has a relatively large annular attachment nut 55, which threadingly engages the upper threaded end of one of the fittings 22. It is pointed out that the annular attachment nut 55 is revolvable relative to the reduced end 56 of the perfusion conduit 45, and this reduced end of the perfusion conduit is preferably formed of a yieldable material, such as nylon or the like. With this arrangement, the nut 55 may be revolved relative to the reduced end 56 of the conduit 45 and thereby avoid twisting of the conduit.

An elongate generally tubular coupling member 57 is positioned interiorly of the bore 23 of the fitting 22 and has reduced end portions 58. One of the reduced end portions 58 is insertable into the end 56, while the other reduced end portion is insertable into a small, flexible conduit 59, which extends into the interior 14a of the receptacle 14. The coupling member 57 has a pair of sealing rings 60 positioned therearound, which engage the interior surface of the fitting 22 to form a seal thereat. These sealing rings are, of course, formed of a yieldable, compressible material, such as rubber or the like.

The lower end of the conduit 59 in the embodiment shown is bifurcated and each branch is connected in communicating relation to a cannula 61, which is insertable into the blood vessel of the organ being preserved. Thus, it will be seen that the perfusion conduit 45 permits gravity flow of a perfusate from the perfusion container 35, so that an organ contained within the preservation receptacle may be perfused during the period of preservation.

A small conduit 62 has one end thereof connected to one of the fittings 22 in the associated closure member 20 and has the other end thereof connected to a fitting located adjacent the downstream side of the coupling 53. A small manually operable valve 63 having a control handle 64 is interposed in flow controlling relation in the conduit 62. The conduit 62 serves to intercommunicate the preservation chamber with the perfusion conduit adjacent the coupling 53.

One end of an elongate flexible conduit 65 is connected to the fitting 42 of the perfusion container 35 and the other end of the conduit is connected to one of the fittings 22 on the closure member 20. Thus, it will be seen that the interior of the preservation receptacle is intercommunicated by the conduit 65 and the standpipe 43 with the volumetric space located in the upper end portion of the perfusion container 35. With this arrangement, the pressure within the perfusion container is in a state of equilibrium with respect to the pressure in the preservation receptacle, thus permitting gravity flow of the perfusate from the perfusion container.

The perfusion container 65 has a pressure responsive safety valve 66 on the upper wall structure 38 thereof, which intercommunicates the interior of the perfusion container with the exterior when the valve is opened. Similarly, each of the closure members 20 also has a pressure responsive safety valve mechanism 67 thereon, which when opened intercommunicates the interior of the preservation chamber with the exterior. These safety valves 66 and 67 are normally closed and in the embodiment shown are preset to open in response to a pressure which exceeds 100 lbs.

Although the circuitry for the percentage valve control mechanism 48 is not shown, the instrument panel 28 is provided with a master switch 68, which is shiftable between opened and closed positions to selectively energize the circuit to the percentage valve control mechanism. The instrument panel also includes pressure gauges to indicate oxygen pressure within each preservation receptacle and also includes temperature gauges to indicate the temperature of the preservation solution within each preservation receptacle. Again, it is pointed out that many of these features are disclosed in my co-pending application Ser. No. 391,931.

During use of the preservation apparatus, a predetermined amount of balanced salt solution bath is placed in the preservation receptacle and the master switch 68 is shifted from the off to the on position to energize refrigeration system so that the coolant within the hypothermia tank will be reduced to a temperature within the range of 0° to 4° C. The preservation receptacle will have been previously sterilized and a predetermined amount of a liquid perfusate will be placed in the perfusion container 35. This perfusate consists of a balanced salt medium, which is sold under the trade name "Tis-U-Sol" and which contains 5% dextran with a low molecular weight of 40 and 50 milligrams of sodium heparin per 500 ml. of solution. A perfusate is buffered to a pH of 7.4 with tromethamine and sodium bircarbonate.

Exemplary of the tests conducted, mongrel dogs were used as both organ donors and as recipients of the transplanted organs. A right nephrectomy is performed on a mongrel dog and the kidney is weighed. Thereafter, the kidney is perfused immediately with a cold perfusate and the organ is thereafter immersed in the preservation solution in the preservation chamber. As pointed out above, the preservation solution has been previously cooled to a temperature within the range of 0° to 4° C. The renal artery is cannulated and perfusion from the perfusion container is thereafter begun.

In this regard, the closure member 20 will have been applied in closing relation with respect to the preservation receptacle and the interior of the receptacle will have been placed under approximately 3 atmospheres of hyperbaric oxygen pressure. The temperature will be approximately 2° C. when perfusion begins and the timer-type percentage valve control mechanism will be preset for intermittent perfusion.

In this regard, the manual valve 46 will be adjusted to permit the proper volume flow and the timer-type percentage valve control mechanism will be preset to permit intermittent perfusion cycles to be continuously carried out. In the test involving mongrel kidneys, perfusion rates of 30 to 50 cc. per hour were maintained. As pointed out above, the percentage timer control valve mechanism will be preset so that actual perfusion will occur approximately only a predetermined percentage of an entire cycle. Thus, if the timer control valve mechanism is set so that perfusion occurs only 20% of a given cycle and if each cycle constitutes a minute's duration, perfusion will actually occur 12 seconds out of every 60 second cycle. This intermittent perfusion is necessary to avoid tension and perivascular edema in the organ.

After removal of the organ from the preservation receptacle, the organ is first weighed and is then transplanted in either subcutaneous neck or groin pouches of the recipient mongrel dog. Thus, during the storage period, the organ will have been maintained in the storage solution at a temperature of between 0 and 4° C. and under approximately 3 atmospheres of oxygen pressure while being subjected to intermittent perfusion. By adjusting the control valve 33, control of the oxygen pressure within the preservation receptacle can be accurately controlled. In this regard, it will be noted that one of the pressure gauges 34 indicates the pressure in conduit 29 while the other gauge 34 indicates the pressure within the oxygen tank 32. Similarly, the temperature of the coolant within the hypothermia tank 13 may also be accurately controlled as well as the rate and time of perfusion.

It has been found that the storage or preservation period in vitro for whole organs, can be lengthened by continuous intermittent perfusion cycles during the period of storage. By practicing hypothermia (0 to 4° C.) and hyperbaria (approximately 3 atmospheres of oxygen pressure), the metabolic needs of the organ tissue is decreased, is also provided with its reduced metabolic needs. The various components of the apparatus, including the continuous intermittent perfusion cycles of the perfusate by gravity drip substantially lengthens the storage life of the organ to be transplanted. In practicing the technique described above, organs including kidneys were successfully stored for 48 hours and in some instances were stored successfully for a period of 72 hours and thereafter transplanted.

From the foregoing description, it will be seen that we have provided a novel whole organ preservation apparatus which permits organs to be placed in a hypothermic, hyperbaric environment while being simultaneously subjected to controlled continuous intermittent cycles of perfusion.

Thus, it will be seen that we have provided a novel whole organ preservation apparatus which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What is claimed is:

1. Apparatus for preserving and maintaining organs in a completely viable state for transplantation, said apparatus comprising, a preservation receptacle having a hollow interior for containing a liquid preserving solution therein in which an organ to be preserved is immersed, said receptacle having an access opening therein to permit access to the interior thereof, removable closure means for closing said access opening whereby the interior of the receptacle is sealed from the exterior, a source of oxygen under pressure, a conduit interconnecting said source of oxygen under pressure with the interior of said preservation receptacle for supplying oxygen under pressure thereto, means for maintaining the oxygen pressure within the preservation receptacle to a pressure of approximately three atmospheres, refrigeration means for cooling said preservation receptacle to a temperature within the range of 0° C. and 4° C., a perfusion container adapted to contain a perfusion solution therein and positioned above said preservation receptacle, an elongate conduit having one end thereof communicating with the upper portion of said perfusion container and having another end portion connected in communicating relation with the interior of said preservation receptacle whereby the oxygen pressure within said receptacle and container are maintained in a state of equilibrium, a perfusion conduit having one end thereof connected in communicating relation to the lower end of the perfusion container connected in communicating relation with the interior of said preservation receptacle, means including a cannula connected to the other end of said conduit and insertable into a vessel of the organ being preserved, whereby the perfusate liquid may be perfused into the organ by action of gravity, a valve interposed in flow controlling relation with respect to said perfusion conduit for opening and closing the latter, and control means for controlling said valve for controlling perfusion to the organ.

2. The preservation apparatus as defined in claim 1 wherein said control means comprises a timer control mechanism which is capable of being preset to permit the valve to be continuously alternately opened and closed, whereby the organ may be perfused in intermittent continuous cycles.

3. The preservation apparatus as defined in claim 1 wherein said perfusion container is provided with a normally closed pressure valve which will open to intercommunicate the interior of the perfusion container with the exterior when the oxygen pressure with said container exceeds a predetermined level.

4. The preservation apparatus as defined in claim 1 and a second valve mechanism connected in flow controlling relation with said perfusion conduit between said perfusion container and said first mentioned valve and being adjustable to control the flow of liquid from said container through said perfusion conduit.

References Cited

UNITED STATES PATENTS

| | | | |
|---|---|---|---|
| 3,406,531 | 10/1968 | Swenson et al. | 62—306 |
| 3,450,153 | 6/1969 | Hildebrandt et al. | 137—486 |

WILLIAM E. WAYNER, Primary Examiner

U.S. Cl. X.R.

62—78, 306; 128—1; 195—127